Dec. 5, 1939.  H. F. PATTERSON  2,182,386
BRAKING MECHANISM
Filed Nov. 11, 1936
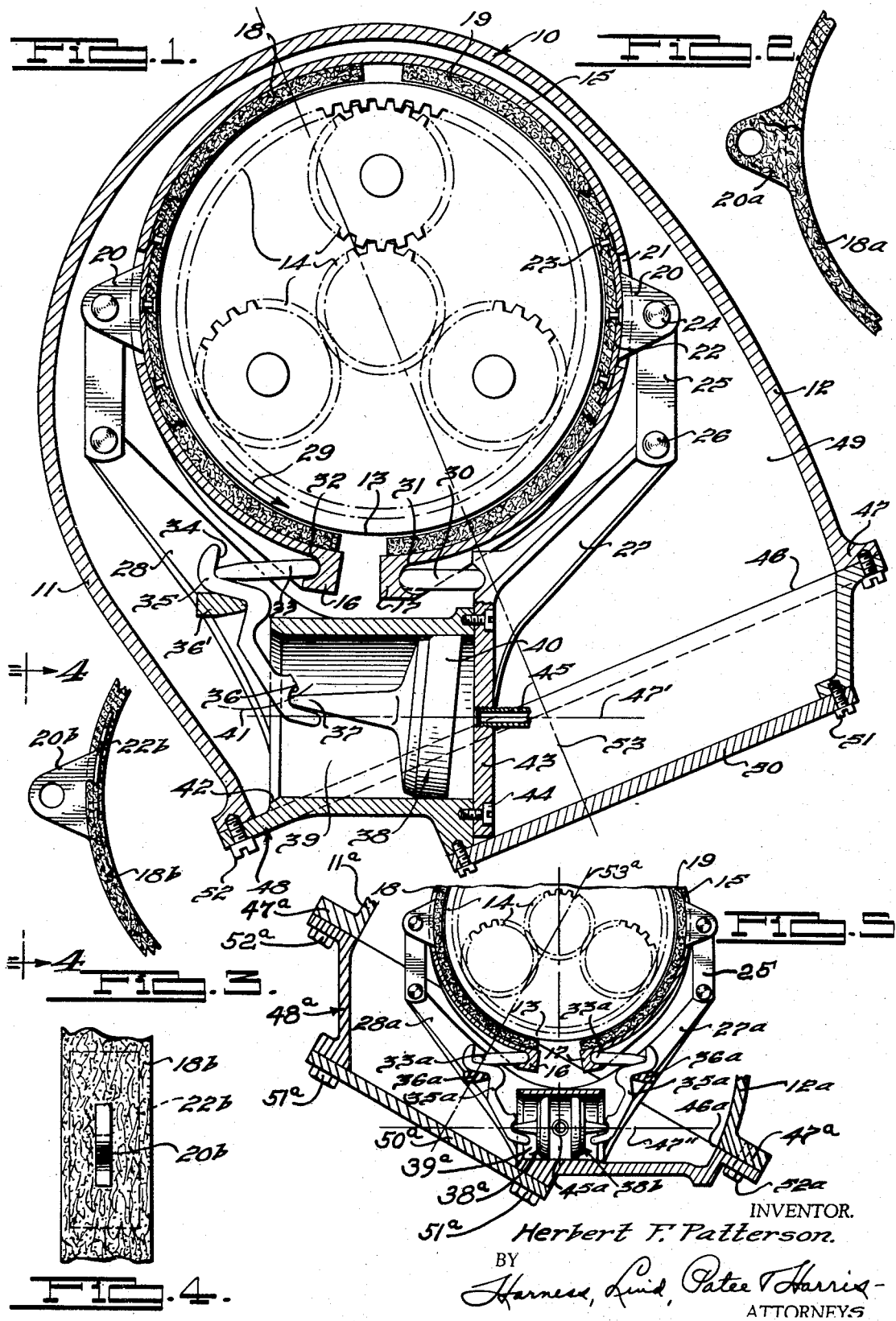
INVENTOR.
Herbert F. Patterson.
BY
Harness, Dind, Patee & Harris
ATTORNEYS Patented Dec. 5, 1939

2,182,386

UNITED STATES PATENT OFFICE 2,182,386

BRAKING MECHANISM

Herbert F. Patterson, Detroit, Mich., assignor to Chrysler Corporation, Highland Park, Mich., a corporation of Delaware Application November 11, 1936, Serial No. 110,197

13 Claims. (Cl. 188—77)

This invention relates to braking devices and refers more particularly to braking mechanism for use with power transmissions of the planetary gear type although in the broader aspects of my invention my improvements are not necessarily limited for use in conjunction with power transmissions.

In the planetary type of transmission it is customary to arrange the planetary gearing to provide the desired number of speed ratio drives between the engine and vehicle driving ground wheels, such gearing being customarily selected and controlled in a well known manner to obtain the desired driving speed ratio by actuation of any one of a group of transmission gearing controlling elements usually consisting of reaction brake bands associated with and controlling the rotation of corresponding drums or similar rotary elements of the various planetary gear trains.

It is an object of my invention to provide improvements in the braking means for establishing the reactionary rotary control for one or more of the gear sets of a planetary type of transmission. While my invention is not necessarily limited in the application thereof to planetary transmissions, it has particular significance when applied to the rotary controlling elements of such transmissions since my invention provides for improved distribution of braking effect to the rotary drums. Difficulty has been experienced in planetary transmissions in connection with objectionable tendency toward displacement of the axis of the rotary drum when the braking force is applied thereto to obtain a driving ratio through the transmission. My invention overcomes the aforesaid objections in an improved manner by providing a braking mechanism adapted to substantially balance the braking forces circumferentially around the drum without the aforesaid tendency toward objectionable displacement of the drum axis.

A further object of my invention resides in the provision of braking means having improved efficiency, especially in connection with drums of planetary transmissions; the braking means being further improved from the standpoints of simplicity, ease of service for making repairs, and ability to assemble and operate the braking mechanism within the limited space ordinarily available in transmissions of the types referred to.

An additional object of my invention is to provide improvements in the assembly and disassembly of planetary braking devices whereby the braking mechanism may be built up as a sub-assembly capable of assembly with the transmission or removal therefrom as a unit. More particularly, I have provided this sub-assembly in conjunction with a cover structure which is attachable to an opening in the transmission housing.

A still further feature of my invention resides in the provision of a novel casing or housing structure having an improved cover arrangement providing for increased road clearance for the transmission; also to facilitate the machining of the fluid pressure cylinders for the brake actuating mechanism where fluid pressure is employed.

Additional objects of my invention are to simplify and lessen the cost of manufacture of the non-metallic friction braking shoes by molding the anchoring lugs as a unit with the shoes, or by embedding the metallic anchors in the body of the shoes during the usual molding formation of the shoes.

Further objects and advantages of my invention will be apparent from the following detailed description illustrative of the principles thereof, reference being had to the accompanying drawing in which:

Fig. 1 is a transverse sectional elevational view through the planetary transmission illustrating my improved braking mechanism in connection with a typical speed ratio control.

Fig. 2 is a fragmentary elevational view of a portion of the non-metallic friction shoe having an anchor lug molded integrally therewith.

Fig. 3 is a corresponding view of a modified arrangement in which a metallic anchor lug has an attaching portion embedded in the shoe during the molding process.

Fig. 4 is a view of the Fig. 3 braking shoe taken as indicated by the line 4—4 of Fig. 3.

Fig. 5 is a sectional fragmentary view corresponding to Fig. 1 but illustrating a modified arrangement of parts.

Referring to the drawing, I have illustrated my invention in connection with a planetary transmission for controlling the driving speed ratio to a motor vehicle, this transmission comprising a casing or housing structure 10 which may extend longitudinally of the vehicle and having the side walls 11 and 12.

The housing 10 is adapted to enclose any number of rotatable elements, preferably in the form of drums, one of which is illustrated at 13 in geared association with the illustrated planetary train 14. The illustration of the planetary gearing is diagrammatic in as much as such arrangements are well known in the art and do not in themselves form any part of my invention. The drum 13 is ordinarily rotated by the planetary gearing and when it is desired to effect a drive through the gearing, a braking force is applied to the drum for arresting rotation thereof to provide the desired speed ratio drive. My invention is more particularly related to improvements in this braking means in association with the drum and planetary gearing and also in connection with the transmission casing 10.

Extending around the drum 13 for approximately 360° of circumferential length is the contractible flexible metallic band 15 having its adjacent end portions 16 and 17 preferably disposed adjacent the bottom portion of the drum. Band 15 has an inherent springing characteristic so that it tends to expand and release the friction means from engaging drum 13 as will presently be more apparent, although if desired one or more springs may be employed to urge expansion of the band.

Disposed intermediate band 15 and drum 13 are a plurality of arcuate circumferentially spaced friction braking shoes 18 and 19, it being understood that more than two shoes may be employed if desired. These braking shoes are separate from band 15 so that they are capable of relative movement independently thereof, the shoes preferably being formed of non-metallic molded friction material commonly employed for brake linings and the like. When a pair of the shoes is employed, according to my preferred arrangement, each of the shoes preferably has a circumferential length of approximately 180°.

One feature of my invention resides in the provision of a novel anchoring means for the shoes 18 and 19 so constructed and arranged that when the ends 16 and 17 of band 15 are relatively brought together, the braking force will be applied substantially uniformly around drum 13 thereby avoiding any objectionable tendency toward displacement of drum 13 and gearing 14 in a direction transversely of the axis of the drum. In carrying out this feature of my invention, I provide each of the shoes with an outwardly projecting anchor lug 20 which is rigidly carried with the shoe at the mid-region of the circumferential length of the shoe. The lugs 20 are thus located substantially at diametrically opposite sides of the drum and transmission, band 15 having the circumferentially extending, diametrically opposite slots 21 for accommodating outward projection of the lugs 20 respectively, the slots 21 having sufficient clearance with the respective lugs 20 to accommodate relative movement circumferentially therebetween. Each of the lugs is provided with a circumferentially extending attaching plate 22 which, in Fig. 1, is secured to one of the shoes by riveting connection therewith at 23.

The shoes 18 and 19 are anchored against rotational displacement through appropriate connection of the lugs 20 with a fixed part of the transmission. Thus, each lug 20 is pivotally connected at 24 with one end of a link 25 which has its other end pivotally connected at 26 with one of the brackets 27 or 28 which form a rigid part of the transmission casing 10. It will be noted that the links 25 are arranged substantially parallel with each other at the opposite sides of the drum 13 and will accommodate the limited amount of radial movement of shoes 18 and 19 toward and from each other when the band 15 is contracted and expanded during normal operation of the braking mechanism.

While any suitable means may be employed for relatively bringing the ends 16 and 17 of the band together, a further feature of my invention has to do with an improved braking force applying mechanism which will now be described. For a counter-clockwise rotation of drum 13 as indicated by arrow 29, the band end 17 is preferably articulated with a fixed abutment, the band end 16 being forced toward the end 17 in contracting the band to apply a braking force to the drum. Thus, the bracket 27 supports a link 30, the inner end of which is received in the pocket 31 while the end 16 is formed with a similar pocket 32 for receiving one end of the thrusting link 33 which has its other end disposed in the pocket 34 of a lever 35 fulcrumed by a lug 36' projecting from bracket 28. The downwardly extending end of lever 35 is formed with a further pocket 36 for receiving the end portion 37 of the fluid pressure operated piston assembly 38 slidable in the cylinder 39, this piston assembly and cylinder constituting a motor for operating the band 15. The piston 38 preferably has a flexible packing material 40 engageable with the inner walls of cylinder 39 and permitting a limited amount of tilting movement of the piston assembly during reciprocation thereof to permit the end 37 to readily follow the arcuate path of movement at 41 in operating the lever 35. The rear end of cylinder 39 is open at 42 facing the side wall 11 while the front end of the cylinder is closed by the cylinder head 43 which is preferably an integral part of bracket 27; this assembly being secured to cylinder 39 by suitable fasteners 44. It will also be noted that the bracket 28 is integrally cast with cylinder 39 for purposes which will presently be more apparent. Any suitable fluid under pressure is adapted for admission to cylinder 39 for operating the piston 20, the fluid pressure inlet being generally indicated at 45 and will be under any suitable type of control.

My piston assembly is of a very simple structure capable of manufacture at low cost and has improved operation in that the piston is self-centering in the cylinder. The packing 40 is caused to slidably and freely engage the cylinder without requiring any guiding means ordinarily provided in non-tilting pistons.

In the operation of the braking mechanism as thus far described, it will be apparent that when fluid pressure is introduced at 45 to cylinder 39, piston assembly 38 will be operated to actuate lever 35 and link 33 in moving band end 16 toward the end 17 for contracting the band 15 and bringing the shoes 18 and 19 into frictional braking engagement with drum 13 for arresting rotation of the latter.

I have further provided a novel arrangement of parts for affording a maximum amount of road clearance at the bottom of the transmission and at the same time providing for convenient machining of the cylinder 39 without interference of the walls 11 or 12 of the transmission housing 10. The side wall 11, assuming the transmission to be supported in the position illustrated, is relatively longer than the wall 12 and the casing 10 is provided with an opening 46 at the bottom of the transmission. The opening 46 is bounded by a flange 47 around the bottom of the casing 10, this flange presenting a bottom face arranged in a plane disposed at an acute angle with the axis 47' of cylinder 39, this bottom face having engagement with a correspondingly inclined cover structure 48. This cover structure preferably has the cylinder 39 integrally cast therewith, it being apparent that by reason of such arrangement the cylinder 39 may be conveniently machined before assembly with the casing 10, and at the same time the inclined arrangement of the cover structure 48 relative to axis 47' provides for a compact arrangement minimizing the depth of the transmission. The arrangement affords an enclosure providing a space generally indicated at 49 for receiving a fluid pressure pump or other desired operating parts of the controlling mechanism (not shown). The cover structure 48 is preferably itself provided with a bottom cover 50 removably secured by fasteners 51 to the inclined underface of cover structure 48, the cover structure being secured by fasteners 52 to the walls 11 and 12 of the transmission casing.

It will be apparent that the entire braking mechanism including shoes 18 and 19, band 15, cylinder 39 and all operating parts connected thereto may be assembled as a unit prior to installation with the transmission. This unitary sub-assembly is insertable through the opening 46, the cover structure 48 being secured in place by fasteners 52 and then the planetary gearing is insertable axially through the band 15 to complete the assembly of the illustrated mechanism.

Instead of supporting the transmission as shown in Fig. 1, I also contemplate the support of the transmission so that the plane 53 lies vertically, this plane being perpendicular with the plane at opening 46 where cover structure 48 engages flange 47. The relative arrangement of all parts will still remain as shown in Fig. 1 but the width of the transmission will be reduced and the side walls 11 and 12 will then lie approximately vertically to perhaps present a somewhat more attractive appearance.

Referring to Fig. 2, I have illustrated a modified type of friction braking shoe which may be employed in the Fig. 1 arrangement. The illustrated shoe 18ª has its anchor lug 20ª molded integrally with the main body portion of the shoe, such arrangement being relatively simple in construction and affording manufacture at very low cost.

Figs. 3 and 4 illustrate a further modified arrangement in which the shoe 18ᵇ is provided with an anchor lug 20ᵇ, the latter having its securing plate portion 22ᵇ embedded in the body portion of the shoe during the molding process for securely attaching the lug and shoe. Such arrangement dispenses with the necessity of any attaching means between the anchor lug and the body portion of the shoe.

Referring now to Fig. 5, the parts illustrated are intended to be substituted in the Fig. 1 assembly. The drum, shoes, and band are as heretofore described and bear similar reference numerals. However, instead of applying braking force to only one end of the band, I bring the band ends toward each other in contracting band 15 in Fig. 5. To this end, cylinder 39ª has its opposite ends open and accommodates the opposed pistons 38ª, 38ᵇ which are forced apart when fluid pressure is introduced to the cylinder at 45ª between the pistons.

Each piston operates a band end 16 or 17 through a lever 35ª and thrust link 33ª, the levers being fulcrumed at 36ª on the respective anchor brackets 28ª and 27ª which, as in Fig. 1, anchor the band through links 25. This double piston arrangement is slightly more expensive in manufacture than the single piston arrangement of Fig. 1 but affords a better balancing of the pressure application to band 15 since links 33ª will similarly tilt slightly during band contraction whereas links 30 and 33 may have a slight relative tilting during their operation of the Fig. 1 arrangement.

In Fig. 5 the cylinder 39ª is integrally cast with cover structure 48ª so that, as before, a sub-assembly is formed of the cover structure 48ª, cylinder 39ª, shoes 18 and 19, anchors 26, band 15, and band operating means including pistons 39ª, 38ᵇ, levers 35ª and links 33ª. The cover structure 48ª is attached to the casing side walls 11ª and 12ª by fasteners 52ª at the opening 46ª, the cylinder axis 47'' lying at an acute angle with the inclined meeting faces at 46ª between cover structure 48ª and flanges 47ª of the walls 11ª and 12ª. Cover structure 48ª, as before, has a bottom cover 50ª secured by fasteners 51ª, the arrangement facilitating machining cylinder 39ª as before. The axis 53ª is also disposed similarly to the corresponding axis 53 of Fig. 1.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a braking mechanism, a rotatable drum, a contractible band substantially surrounding said drum, a plurality of circumferentially spaced shoes separate from said band and lying therewithin for frictional contact with said drum, means for anchoring said shoes at locations intermediate their lengths, and means for contracting said band to bring said shoes into frictional engagement with said drum.

2. In a braking mechanism, a rotatable drum, a contractible band substantially surrounding said drum, a plurality of circumferentially spaced shoes separate from said band and lying therewithin for frictional contact with said drum, means for anchoring said shoes at substantially diametrically spaced locations intermediate their lengths respectively, and means for contracting said band to bring said shoes into frictional engagement with said drum.

3. In a braking mechanism, a rotatable drum, a contractible band substantially surrounding said drum and having its opposite ends disposed adjacent each other, a plurality of circumferentially spaced shoes separate from said band and lying therewithin for frictional contact with said drum, means for anchoring said shoes at locations intermediate their lengths, and means for bringing said band ends relatively together to contract said band and thereby cause said shoes to frictionally engage said drum.

4. In a braking mechanism, a rotatable drum, a contractible band substantially surrounding said drum and having its opposite ends disposed adjacent each other, a plurality of circumferentially spaced shoes separate from said band and lying therewithin for frictional contact with said drum, means for anchoring said shoes at locations intermediate their lengths, means for anchoring one end of said band, and means for moving the other end of said band to contract the band and thereby cause said shoes to frictionally engage said drum.

5. In a braking mechanism, a rotatable drum, a contractible band substantially surrounding said drum, a plurality of circumferentially spaced shoes separate from said band and lying therewithin for frictional contact with said drum, a plurality of links each pivotally connected at one end thereof to one of said shoes intermediate the length thereof, means for pivotally anchoring the other ends of said links, and means for contracting said band to bring said shoes into frictional engagement with said drum.

6. In a braking mechanism, a rotatable drum, a contractible band substantially surrounding said drum, a plurality of circumferentially spaced shoes separate from said band and lying therewithin for frictional contact with said drum, a plurality of links each pivotally connected at one end thereof to one of said shoes intermediate the length thereof, means for pivotally anchoring the other ends of said links, said links lying substantially tangentially of said drum, and means for contracting said band to bring said shoes into frictional engagement with said drum.

7. In a braking mechanism, a rotatable drum, a contractible band substantially surrounding said drum, a plurality of circumferentially spaced shoes separate from said band and lying therewithin for frictional contact with said drum, a plurality of links each pivotally connected at one end thereof to one of said shoes intermediate the length thereof, means for pivotally anchoring the other ends of said links, said links lying substantially parallel with each other and approximately tangentially of said drum, and means for contracting said band to bring said shoes into frictional engagement with said drum.

8. In a braking mechanism, a rotatable drum, a contractible band extending approximately 360° around said drum and having opposite ends disposed adjacent each other, a pair of circumferentially spaced shoes separate from said band and lying therewithin for frictional contact with said drum, each of said shoes extending approximately 180° around said drum, means for anchoring each of said shoes substantially midway circumferentially thereof, and means for relatively moving said band ends to contract the band and thereby cause said shoes to frictionally engage said drum.

9. In a braking mechanism, a rotatable drum, a contractible band extending approximately 360° around said drum and having opposite ends disposed adjacent each other, a pair of circumferentially spaced shoes separate from said band and lying therewithin for frictional contact with said drum, each of said shoes extending approximately 180° around said drum, means for anchoring each of said shoes substantially midway circumferentially thereof, and means for relatively moving said band ends to contract the band and thereby cause said shoes to frictionally engage said drum, each of said anchoring means comprising a link pivotally connected at its opposite ends with a shoe and a relatively fixed part of the mechanism respectively.

10. In a braking mechanism for a planetary gear transmission, a housing structure, a rotatable drum within said housing structure, a cylinder lying below said drum and having its axis disposed transversely with the axis of the drum, a band substantially surrounding and having its ends disposed adjacent each other intermediate said drum and cylinder, shoe means intermediate said band and drum, means for anchoring one end of said band, a piston operable in said cylinder, and means operably connecting said piston with the other end of said band for contracting said band.

11. In a braking mechanism for a planetary gear transmission, a rotatable drum, a casing structure housing said drum and having an opening, a cover structure for said opening, braking means engageable with said drum exteriorly thereof, means carried by said cover structure for operating said braking means, and means for anchoring said braking means entirely on said cover structure.

12. In a braking mechanism for a planetary gear transmission, a rotatable drum, a casing structure housing said drum and having an opening, a cover structure for said opening, braking means engageable with said drum exteriorly thereof, a cylinder carried by said cover structure, a piston operating in said cylinder for actuating said braking means, and means for anchoring said braking means entirely on said cover structure.

13. In a planetary gear transmission, a rotatable drive control element, means operable to frictionally engage said element, a pressure fluid operated motor for operating said frictionally engageable means, means for supporting said frictionally engageable means entirely on said motor, and means operably connecting said motor with said frictionally engageable means including a lever fulcrumed on said supporting means.

HERBERT F. PATTERSON.